United States Patent Office 3,437,687
Patented Apr. 8, 1969

3,437,687
CHLORINATED METHYLMUCONATES AND THEIR PREPARATION
Lewis F. Hatch, Marburg am der Lahn, Germany, assignor to Sun Oil Company, Philadelphia, Pa., a corporation of New Jersey
No Drawing. Filed July 29, 1966, Ser. No. 568,743
Int. Cl. C07c 69/52
U.S. Cl. 260—485                             11 Claims

ABSTRACT OF THE DISCLOSURE

The invention relates to a new composition of matter and a method of preparing the same. Specifically the invention relates to the halogenation of $\alpha,\alpha'$-dimethylmuconate esters to produce 2,3-dihydro-2,3,4-trihalo-$\alpha,\alpha'$-dimethylmuconate esters which are useful as extreme pressure addition agents in lubricants.

---

This invention relates to the preparation of a new composition of matter and a method of preparing the same. Specifically the invention relates to the halogenation of $\alpha,\alpha'$-dimethylmuconate esters to produce 2,3-dihydro-2,3,4-trihalo-$\alpha,\alpha'$-dimethylmuconate esters.

Dialkyl-$\alpha,\alpha'$-dimethylmuconate is an ester of $\alpha,\alpha'$-dimethylmuconic acid which is a dibasic, unsaturated acid which can exist in three isomeric forms, cis-cis, cis-trans, and trans-trans, which can be depicted by the following structural formulas:

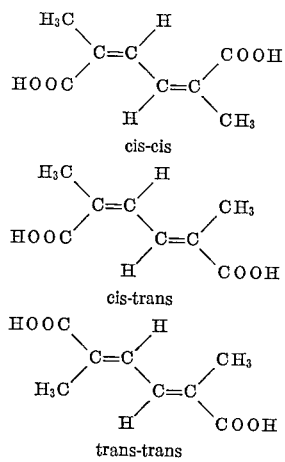

These isomeric forms are white crystalline powders with the physical properties listed in Table I.

TABLE I

|                                 | Cis-cis     | Cis-trans   | Trans-trans |
|---------------------------------|-------------|-------------|-------------|
| Molecular weight                | 170.2       | 170.2       | 170.2       |
| Melting point, °C               | [1] 223–224 | [1] 179–180 | [1] 332–333 |
| Ionization constants:           |             |             |             |
| At 25° C                        | p$K_1$      | 3.65        |             |
|                                 | p$K_2$      | 5.20        |             |
| Solubility, g./100 g. solution, |             |             |             |
| 25.0° C.:                       |             |             |             |
| Water                           | 0.026       | 0.244       | 0.0036      |
| Do                              | [2] 0.24    | [2] 1.97    | [2] 0.032   |
| Ethyl alcohol                   | 3.30        | 22.7        | 0.39        |
| Ethyl acetate                   | 0.185       | 2.17        | 0.39        |
| Acetone                         | 0.994       | 7.60        | 0.112       |
| Benzene                         | 0.006       | 0.023       | 0.008       |

[1] Melting point varies with the rate of heating.
[2] At 80° C.

The preparation of each of the isomeric forms has been described by Elvidge et al., J. Chem. Soc., pp. 1026–1033 (1952). These authors also show the preparation of the dimethyl esters of the three isomeric diacids. Additionally the acids may be prepared by the method disclosed in United States Patent 3,383,289, Raymond et al., issued May 14, 1968, which involves the fermentation of methylbenzenes to produce unsaturated dibasic acids.

The dialkyl esters of the acids can be prepared by conventional esterification techniques, such as by reacting the diacid with an alkanol or dialkyl sulfate in the presence, respectively, of an acidic or basic catalyst. Higher esters can be made from the dimethyl esters by transesterification of the same with a higher alcohol in the presence of a basic catalyst.

The halogenation of conjugated systems has been the subject of a great deal of experimental work. Muskat and Becker, J. Am. Chem. Soc., pp. 812 to 818 (1930) studied the chlorination of vinylacrylic acid. They showed that under varied experimental conditions, chlorination of this compound always gives the gamma ($\gamma$), delta ($\delta$) addition product:

(I)

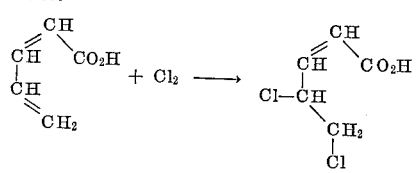

If in no case was a different dichloride obtained even though the reaction conditions were varied considerably. For example, the reaction was run in various solvents, such as chloroform, ligroin, carbon tetrachloride, carbon bisulfide and glacial acetic acid and the temperature was varied from about $-20°$ to about $50°$.

Muskat, Becker and Lowerstein, J. Am. Chem. Soc., pp. 326 to 332 (1930) also showed that the bromination of vinylacrylic acid gives the $\alpha, \delta$ addition product.

Chandrasena and Ingold, J. Chem. Soc., pp. 121 and 1307 (1922) showed that the product of addition of one molecule of bromine to ethyl muconate is the alpha ($\alpha$), beta ($\beta$)-dibromide and Ingold, Prichard and Smith, J. Chem. Soc., pp. 79 to 86 (1934) confirmed this orientation.

Another example of addition of halogen to unsaturated acids, although not dealing with conjugated systems, may be found in United States Patent No. 2,865,953. This patent teaches chlorinating unsaturated dibasic acids of high molecular weight according to the following reaction:

II)

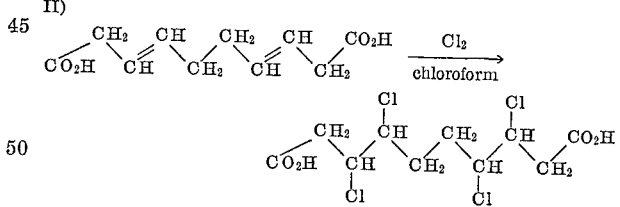

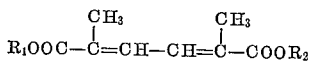

The present invention is concerned with the chlorination of conjugated systems, specifically with the chlorination of esters of $\alpha,\alpha'$-dimethylmuconic acid having the following general formula:

$$R_1OOC-\underset{CH_3}{\underset{|}{C}}=CH-CH=\underset{CH_3}{\underset{|}{C}}-COOR_2$$

wherein $R_1$ and $R_2$ are primary, secondary, or tertiary alkyl groups having 1 to 20 carbon atoms, and may be the same or different groups. $R_1$ and $R_2$ may be either straight chain or branched, and include primary, secondary, and tertiary alkyl groups. It is usually preferred that $R_1$ be a primary alkyl group since the dimethylmuconate esters generally are more readily prepared from primary alcohols. An increase in the size of the $R_1$ group tends to increase the hydrocarbon solubility of the products. Consequently, in some cases it may be desirable to have relatively large $R_1$ and $R_2$ groups, e.g., decyl, lauryl or stearyl. In other cases, $R_1$ and $R_2$ groups of lower molecular weight, such as methyl, ethyl, propyl, butyl or pentyl, generally are more desirable.

The present invention provides a method for halogenating these compounds to produce chlorinated esters having the following general formula:

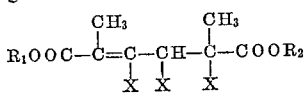

wherein $R_1$ and $R_2$ are defined as above and X is chlorine or bromine.

Addition takes place at only one $\alpha,\beta$ position of the conjugated system. In addition, surprisingly the $\beta'$ carbon is halogenated. Whether the halogenation at this position is by the mechanism of substitution or whether both the $\beta'$ and $\alpha'$ carbons halogenate by addition with subsequent elimination of hydrogen halide is not known. Nevertheless, from the teachings of halogenation of conjugated bonds discussed above, an $\alpha,\beta$ dihalide or an $\alpha,\beta,\alpha',\beta'$ halide would be the expected products of the reaction rather than the $\alpha,\beta,\beta'$ trihalide.

Muskat et al., J. Am. Chem. Soc., pp. 812 to 818 (1930) at p. 813 do teach the preparation of a compound, $$CH_2\!=\!CClCH\!=\!CHCO_2H$$

or $CHCl\!=\!CHCH\!=\!CHCO_2H$ and the chlorination of this compound to the trichloride. However, this compound is prepared only through a sequence of three distinct steps as follows:

(i) chlorination of vinylacrylic acid to the dichloride according to Equation (I);

(ii) treating the dichloride with two molar equivalents of sodium hydroxide at 0° with subsequent acidification with cold dilute acid to give the monochlorovinylacrylic acid;

(iii) chlorinating the monochlorovinylacrylic acid to give the trichloro derivative.

On the other hand, the process of the present invention of halogenating esters of $\alpha,\alpha'$-dimethylmuconic acid gives directly the trihalo esters, 2,3-dihydro-2,3,4-trihalo-$\alpha,\alpha'$-dimethylmuconates.

The process of the invention comprises: contacting the dialkyl esters of $\alpha,\alpha'$-dimethylmuconic acid with chlorine or bromine in a chloroform or bromoform diluent at about $-25°$ to about 100° C. whereby halogenation occurs to give a 2,3-dihydro-2,3,4-trihalo-$\alpha,\alpha'$-dimethylmuconate and thereafter recovering the product from the reaction mixture.

In carrying out the reaction the starting diester of $\alpha,\alpha'$-dimethylmuconic acid, which diester is usually a crystalline solid, is dissolved in chloroform or bromoform. It is a particular characteristic of the present process that the reaction is carried out in chloroform or bromoform, since the reaction does not appear to work in some of the other solvents conventionally used for halogenation reactions. For example, when the reaction is run in carbon tetrachloride very little reaction product is recovered.

After the ester has been dissolved, a stream of dry halogen is allowed to pass into the solution at any temperature in the range of $-40°$ C. to about 100° C., preferably at a temperature in the range of $-20°$ C. to about 50° C. Absorption takes place readily and the reaction mixture becomes warm. Means may be provided for maintaining the temperature at the desired level as the reaction progresses. Contacting of the halogen with the mixture may be stopped when the theoretical quantity of chlorine has been absorbed. The reaction product may be separated from the other constituents in the resulting reaction mixture by vacuum distillation.

The halogenated compounds produced by this invention are useful as extreme pressure addition agents in lubricants as taught, for example, by United States Patent No. 2,318,013.

The following example illustrates the invention:

A stream of dry chlorine was allowed to pass into a chloroform solution of cis-cis dimethyl-$\alpha,\alpha'$-dimethylmuconate for a period of 45 minutes at 0° C. At the end of this time the chlorine stream was shut off and the reaction mixture allowed to stand for one hour. The reaction product was distilled under reduced pressure to give a 30 percent yield of a colorless liquid which was determined by nuclear magnetic resonance, vapor phase chromatography and infrared spectroscopy to be cis dimethyl 2,3-dihydro-2,3,4-trichloro-$\alpha,\alpha'$-dimethylmuconate.

When the other isomers of dimethylmuconate esters are chlorinated, equivalent results are obtained.

What is claimed is:

1. A 2,3-dihydro-2,3,4-trihalo-$\alpha,\alpha'$-dimethylmuconate having the formula

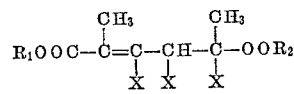

wherein $R_1$ and $R_2$ are alkyl groups having 1 to 20 carbon atoms and X is chlorine or bromine.

2. A compound according to claim 1 wherein X is chlorine.

3. A compound according to claim 1 wherein X is bromine.

4. A compound according to claim 2 wherein $R_1$ and $R_2$ are primary alkyl groups.

5. A compound according to claim 4 which is dimethyl-2,3-dihydro-2,3,4-trihalo-$\alpha,\alpha'$-dimethylmuconate.

6. A compound according to claim 5 which is cis dimethyl-2,3,-dihydro-2,3,4-trichloro-$\alpha,\alpha'$-dimethylmuconate.

7. A process for making compounds as defined in claim 1 which comprises contacting a dialkyl ester of $\alpha,\alpha'$-dimethylmuconic acid, in which the alkyl groups correspond to $R_1$ and $R_2$ of claim 1 with chlorine or bromine, in a diluent selected from chloroform and bromoform, at a temperature from about $-40$ to about 100° C. whereby halogenation occurs to give said compounds of claim 1

8. Process according to claim 7 wherein said ester is contacted with chlorine.

9. Process according to claim 7 wherein said ester is contacted with bromine.

10. Process according to claim 7 wherein $R_1$ and $R_2$ are primary alkyl groups.

11. Process according to claim 7 wherein the process is carried out at a temperature in the range of $-20°$ to about 50° C.

References Cited

Chandrasena et al., J. Chem. Soc., pp. 121 and 1307 (1922).

JAMES A. PATTEN, *Primary Examiner*

E. J. SKELLY, *Assistant Examiner*

U.S. Cl. X.R.

252—54